United States Patent

Hageltorn et al.

[11] Patent Number: 6,006,117
[45] Date of Patent: Dec. 21, 1999

[54] RADIO TELEPHONE WITH SEPARATE ANTENNA FOR STAND-BY MODE

[75] Inventors: Göran Hageltorn, Ottawa, Canada; Thomas Bolin, Lund; Christer Tornevik, Järfälla, both of Sweden

[73] Assignee: Telefonaktiebolaget LM Ericsson, Stockholm, Sweden

[21] Appl. No.: 08/802,259

[22] Filed: Feb. 19, 1997

[30] Foreign Application Priority Data

Dec. 23, 1996 [WO] WIPO ............... PCT/SE96/01741

[51] Int. Cl.⁶ .................................................... H04B 1/38
[52] U.S. Cl. ...................... 455/575; 455/70; 455/129; 455/348
[58] Field of Search ............... 455/575, 90, 129, 455/272, 550, 351, 78, 348; 343/702, 860, 876, 895

[56] References Cited

U.S. PATENT DOCUMENTS

| | | | |
|---|---|---|---|
| 4,914,714 | 4/1990 | Tamura | 455/78 |
| 5,276,920 | 1/1994 | Kuisma | 455/129 |
| 5,337,061 | 8/1994 | Pye et al. | 343/702 |
| 5,497,506 | 3/1996 | Takeyasu | 455/575 |
| 5,554,996 | 9/1996 | Chatzipetros | 455/575 |
| 5,640,689 | 6/1997 | Rossi | 455/90 |
| 5,649,306 | 7/1997 | Vannatta et al. | 455/90 |

FOREIGN PATENT DOCUMENTS

| | | |
|---|---|---|
| 0 511 577 A2 | 4/1992 | European Pat. Off. . |
| 2 293 726 | 4/1996 | United Kingdom . |
| WO 93/01659 | 1/1996 | WIPO . |

*Primary Examiner*—Wellington Chin
*Assistant Examiner*—Senal Kibreab
*Attorney, Agent, or Firm*—Burns, Doane, Swecker & Mathis, L.L.P.

[57] ABSTRACT

A radio telephone for use in wireless telecommunication has a transmitter/receiver unit (4), a control unit (5), a first antenna (1), the properties of which are optimized for use in stand-by mode, and a second antenna (2), the properties of which are optimized for use during ongoing calls, said second antenna being electrically engageable and disengageable with the transmitter/receiver unit. The radio telephone further has an antenna switch (3), which is arranged to operatively connect the transmitter/receiver unit (4) to either the first antenna (1) or the second antenna (2), said antenna switch supplying the control unit (5) with control signals (7) in response to at least the electrical engagement status of the second antenna. The control unit prevents ingoing as well as outgoing calls from being established, as long as the second antenna according to said control signals is indicated to be electrically disengaged.

18 Claims, 6 Drawing Sheets

RADIO TELEPHONE WITH SEPARATE ANTENNA FOR STAND-BY MODE

TECHNICAL FIELD

The present invention relates to a radio telephone for use in wireless telecommunication, comprising a transmitter/receiver unit, a control unit, a first antenna, the properties of which are optimized for use in stand-by mode, and a second antenna, the properties of which are optimized for use during ongoing calls, said second antenna being electrically engageable and disengageble with the transmitter/receiver unit. The present invention further relates to a method for controlling the establishment of incoming and outgoing calls in such a radio telephone.

BACKGROUND ART

Nowadays, wireless telecommunication is at least as common as the more conventional wired form of telecommunication. An increasing part of the population in almost every country uses wireless radio telephones, especially cellular telephones, in the daily life. The term "radio telephone" includes all portable equipment, which may be used for radio communication, e.g. cellular telephones, so-called personal communicators or organizers, etc. The predictions for the future further indicate an even more frequent use of such telephones, and in a not too distant future it is possible that wireless telecommunication systems will become more common than the ones using wires.

In mobile telephone systems, or so called cellular telephone systems, a telephone company—public or commercial—provides a number of geographically distributed base stations. Each base station is arranged to cover a certain area, a so-called cell, and the various areas are selected in such a way, that they to the highest possible extent together cover a continuous geographical area. The base stations are arranged to forward incoming and outgoing calls to and from any mobile stations, such as radio or mobile telephones, present in the area, and hence each base station is connected to the public wired telecommunication network. A mobile station in a modern telecommunication system, such as GSM (Global System for Mobile Service), has two main modes of operation, the first of which being during ongoing calls with an intense communication between the mobile station and the base station in question. The second mode of operation is the stand-by mode, i.e. when the mobile station is not serving any ongoing call, a certain communication with the base station, however, still occuring at a regular basis. For instance, when the user turns on his mobile station, the mobile station will search for available base stations and select the one with the highest signal strength. Then the mobile station reports its presence to the selected base station. The mobile station will then regularly receive information from the base station, for instance frequency synchronization information. If the signal strength turns out to be lower than the signal strength of any other available base station, a switch to the latter normally occurs (so-called hand-over). Furthermore, a bidirectional so-called handshake communication takes place between the mobile station and the base station, when an incoming call is to be established. Thanks to the above it is possible to provide services like roaming (the system detects and keeps record of subscribers for the moment being abroad), SMS (Short Messages Services; transmission of short text messages to be presented on the telephone display), and CB (Cell Broadcast; broadcast messages from, e.g. a public authority to several mobile telephones present in a cell).

Other kinds of wireless telecommunication are known, which are not connected to the public wired telephone network. One example is dispatching applications, i.e. non-public radio systems used by e.g. taxi services, the police authorities, or transportation companies. Another example is local or global paging systems, and yet another one is cordless telephone systems, such as DECT (Digital European Cordless Telephone System).

For speech or data information to be transmitted in a wireless way in a communication system mentioned above, transmitters as well as receivers of electro-magnetic energy are required. In the transmitter as well as the receiver the information is electrically processed, regardless whether it is an analog or digital communication system. The transmitter as well as the receiver are connected to conversion means, such as an antenna, for conversion between electrical and electromagnetic energy. The wireless information transmission is effected by the radio frequent electro-magnetic fields generated around the transmitter antenna and propagated away from the antenna, then by the speed of light reaching the receiver antenna.

Various demands are placed upon the mobile station antennas in a modern mobile telephone system, since the antennas are heavily used during ongoing calls as well as during stand-by mode, as described above. Financial demands as well as claims for cost-efficiency are obvious. Another common demand is a long operation time between battery chargings, and to be able to fulfil such a demand the mobile station has to preserve the amount of electrical energy available, thereby requiring a high antenna conversion efficiency. Usually, the antenna and signal quality requirements are stricter during ongoing calls than during stand-by mode.

Furthermore, the physical dimensions of the mobile telephone are very important. For a mobile telephone to be regarded as useful by the users of today, a low-weight, compact and yet robust format is required; preferably, the mobile telephone should fit inside jacket pockets, handbags, etc, or it should be possible to carry the telephone by the waistbelt by means of a beltclip. The demands on compactness and robustness obviously also apply to the mobile telephone antennas.

During ongoing calls a mobile telephone is normally positioned in close vicinity of the user, and, as a consequence thereof, the user's body—the hand and the head in particular—will inevitably affect the signal properties of the antenna. Such interaction between the body and the near field of the antenna usually results in deteriorated antenna properties, mainly due to reflections and absorption losses. Specifically, this signal degradation will increase, if the distance is reduced between the antenna and the body, and obviously, there is a severe difficulty in achieving a high antenna efficiency as well as physical compactness and robustness at the same time.

Various antenna types are used in the mobile stations of today, for instance half or quarterwave whip antennas, dipole antennas, helix antennas, etc. Different antenna types are suitable to different extents when it comes to signal properties and antenna efficiency. For instance, the helix antenna is often used, since—thanks to its helical shape—it may be given a compact size and a good resistance against damages. However, it does not show an antenna efficiency as good as that of a half-wave whip antenna.

Due to space considerations mobile telephones are furthermore often provided with extendable whip antennas, which in some cases are supplemented by separate external antennas for use in stand-by mode, since a whip antenna fully retracted into a metal telephone housing is isolated from its surroundings with respect to its signal emission. The international patent publication WO 93/01659 from Motorola, Inc., discloses a radio telephone, whose antenna may be moved between a retracted and an extended position. The telephone has two different operating modes, in dependency of the antenna being extended or not. These operating modes may for instance be related to the display being lit or not, the keypad being engaged or disengaged, or to different levels of transmission effect.

SUMMARY OF THE INVENTION

The purpose of the present invention is to optimize the antenna configuration of a mobile station with respect to the demands and problems described above. The invention is particularly aimed at providing an antenna system with high performance during ongoing calls as well as in stand-by mode. The object is achieved by using two different antennas, the first of which having a small and compact format, being resistant against external mechanical stress, and being used during the stand-by mode of the mobile station, and the second of which being a longer antenna, intended to be used during ongoing calls only and having such properties, e.g. physical length or position, which result in insignificant signal degradation and a high antenna efficiency. Furthermore, the second antenna is preferably fully or partly retracted into a telephone housing—or folded down alongside said housing—in other situations than during ongoing calls, and according to the invention measures have been taken in order to prevent the first antenna, which is intended to be used in stand-by mode, from being used during calls.

BRIEF DESCRIPTION OF THE DRAWINGS

The invention will be described in more detail below, reference being made to the accompanying drawings, in which FIG. 8b is a cross sectional view of the radio telephone according to FIG. 8a.

DETAILED DESCRIPTION OF THE INVENTION

Figure 1:
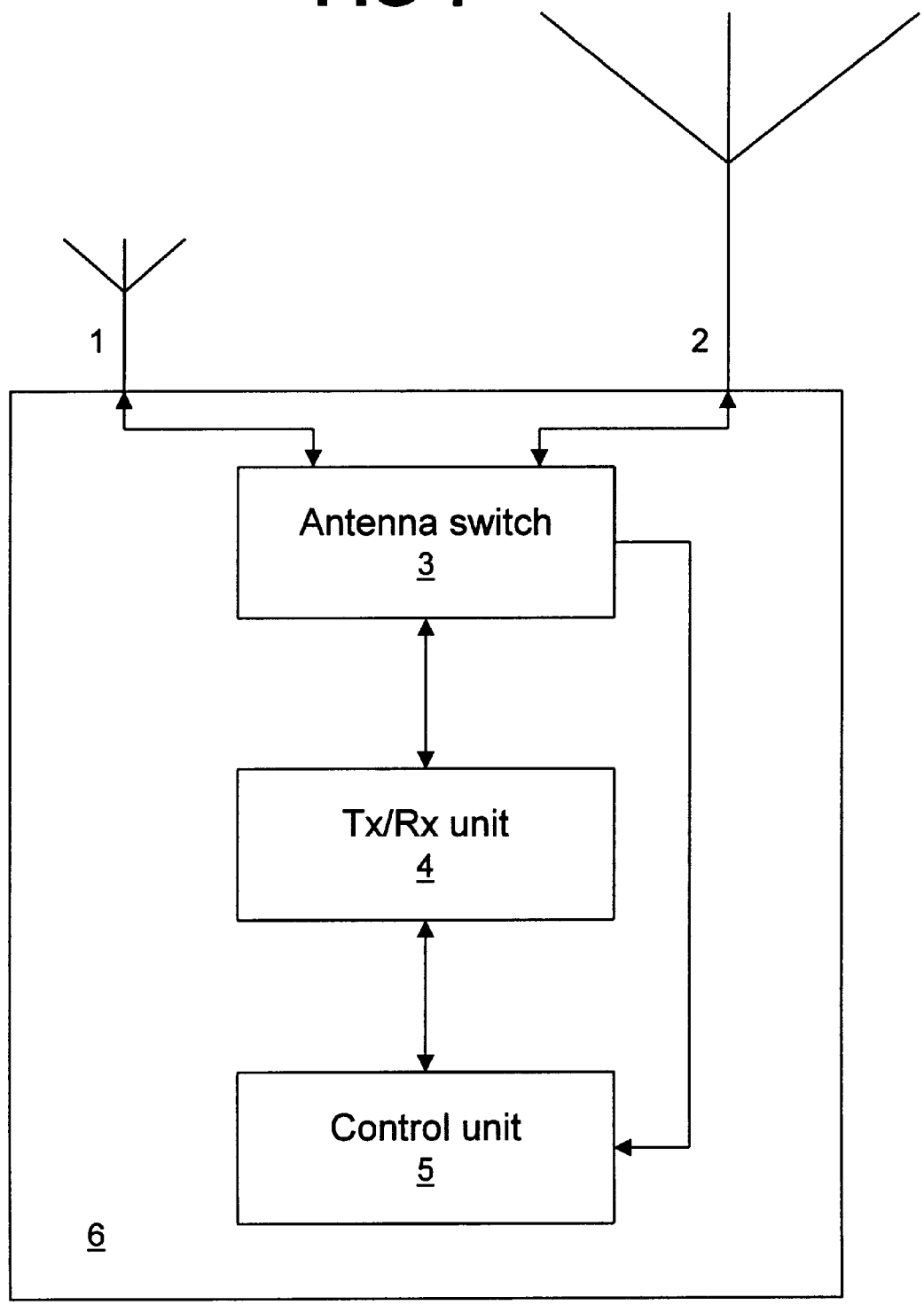
FIG. 1 is a schematic view of a radio telephone, in which the present invention is applied.

In FIG. 1 there is shown a radio telephone functioning as a mobile station, in which the antenna system according to the present invention is applied. For exemplifying but not limiting reasons the disclosed mobile telephone is of the type used in a modern telephone system, such as GSM or NMT. The telephone comprises a housing 6, a small antenna 1, a large antenna 2, an antenna switch 3, a transmitter/receiver unit 4, a control unit 5, and various means and devices not shown, such as a keypad, display, battery, earpiece, microphone, etc.

The small antenna 1 is intended to be used during the stand-by mode of the mobile telephone—i.e., when no user controlled communication is taking place—and consequently the small antenna 1 has a compact format suitable for this purpose. The antenna 1, which hereinafter will be referred to as the stand-by antenna, preferably has a substantially shorter physical extension in comparison with its electrical length, which for instance may be achieved by winding the electrical conductor of the antenna in a helical shape. The performance requirements on the antenna 1 are less strict than those placed upon antenna 2, since antenna 1 is used in stand-by mode only. For maximum compactness the antenna 1 is preferably of a quarter-wave type.

The large antenna 2 is intended for use during calls, and it is consequently hereinafter referred to as the call antenna. The properties of this antenna make it well suited for its purpose. It has a physical length and/or a position such that the influence from the user's body on the signal properties is small or even negligible, thereby facilitating optimum antenna efficiency. Preferably the call antenna is a half-wave antenna.

By controlling the operation of the mobile station as described below, it is ensured that the antenna most suitable for each respective operating mode (stand-by mode and call mode, respectively) is used.

The control unit is preferably realized by means of a microprocessor and its associated software routines, even if its functions described below may be carried out in many different ways in hardware, for instance by means of a digital switching net, as is easily realized by a man skilled in the art of digital switching. In order to minimize the cost preferably the same central processing unit (CPU) is used, which controls the main operation of the mobile station, or any other co-processor already used in conventional mobile stations.

Figure 2:
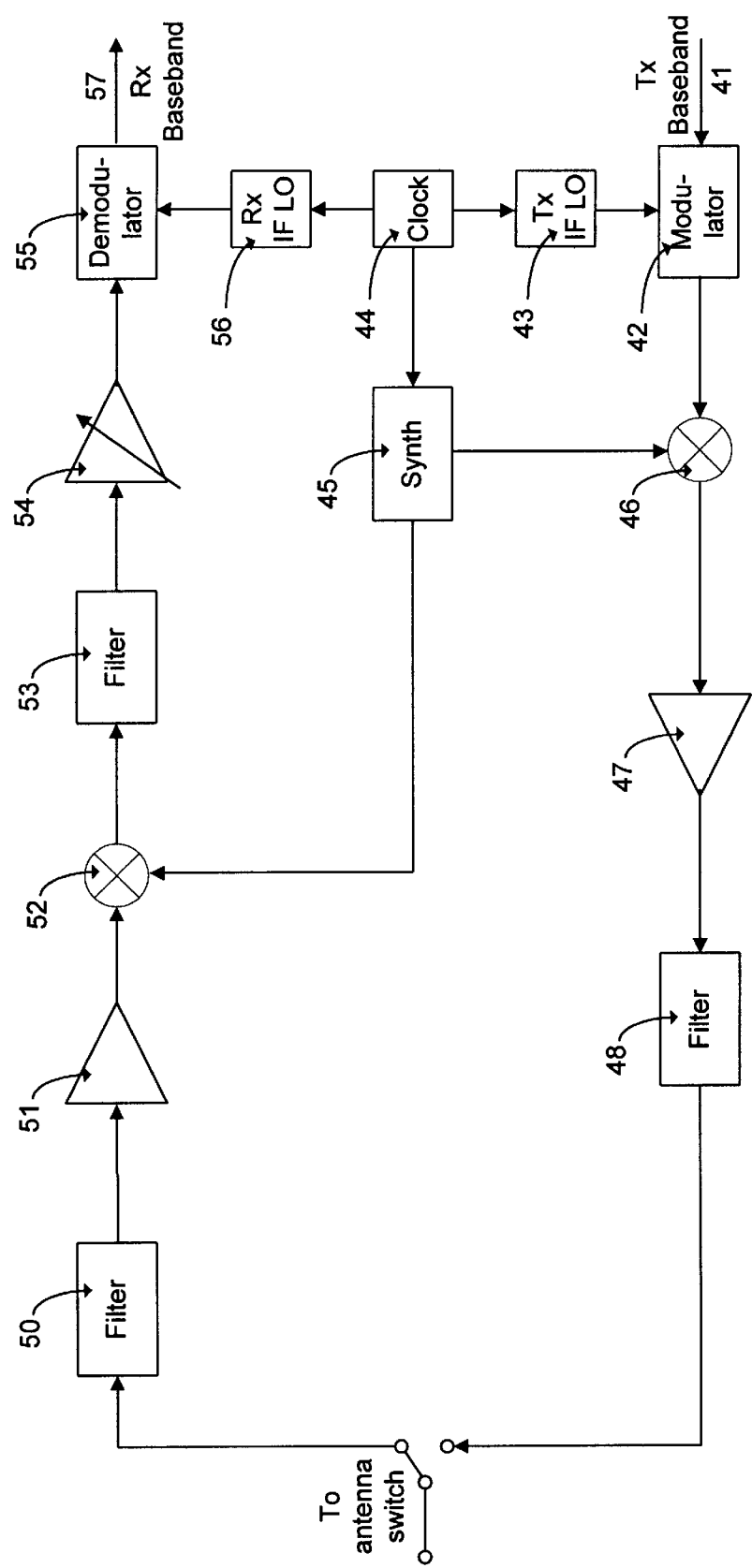
FIG. 2 is a block diagram of the transmitter/receiver unit in FIG. 1, FIGS. 3 and 4 are sectional views of a preferred embodiment of the antennas in FIG. 1.

In FIG. 2 there is shown a block diagram of the transmitter/receiver unit 4. The transmitter/receiver unit is essentially of a conventional design, and hence its operation is only described below in summary. In transmitting mode the information to be transmitted, i.e. a baseband signal 41 ("Tx Baseband"), is arriving to a modulator 42 in either digital or analog form from the control unit 5. There the baseband signal 41 modulates an intermediate frequency signal from a transmitter local oscillator 43, which in turn receives clock signals from a clock circuit 44. The modulated intermediate frequency signal is then mixed in a mixer 46 with a carrier wave generated by a synthesizer 45. The obtained high frequency signal is amplified and filtered in an amplifier 47 and a filter 48, respectively, the signal then being sent to the antenna presently being selected by the antenna switch 3.

In reception mode a signal received by the antenna is supplied to a filter 50 and an amplifier 51 to be filtered and amplified. The high frequency signal is mixed down to an intermediate frequency in a mixer 52 by means of a signal from the synthesizer 45. Then filtering and amplification again take place in a filter 53 and an amplifier 54, respectively, the demodulation then being carried out in a demodulator 55 by means of an intermediate frequency signal from a receiver local oscillator 56. The baseband signal 57 ("Rx Baseband") obtained may then be decoded in a well-known way or signal processed in circuits not shown here.

Figure 3:
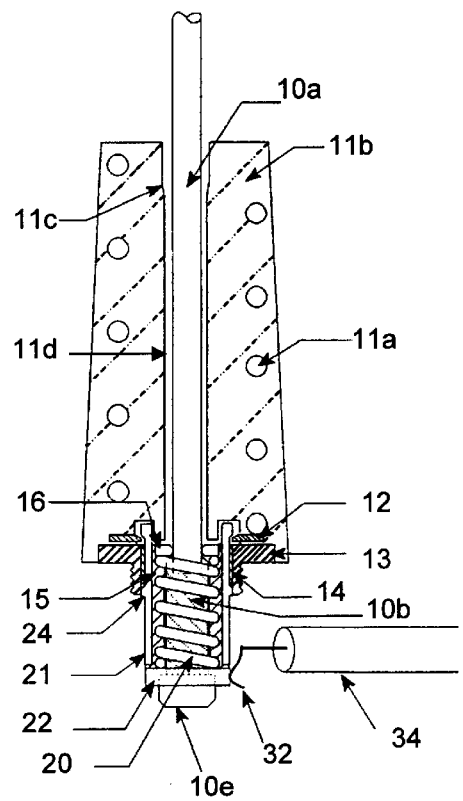
Figure 4:
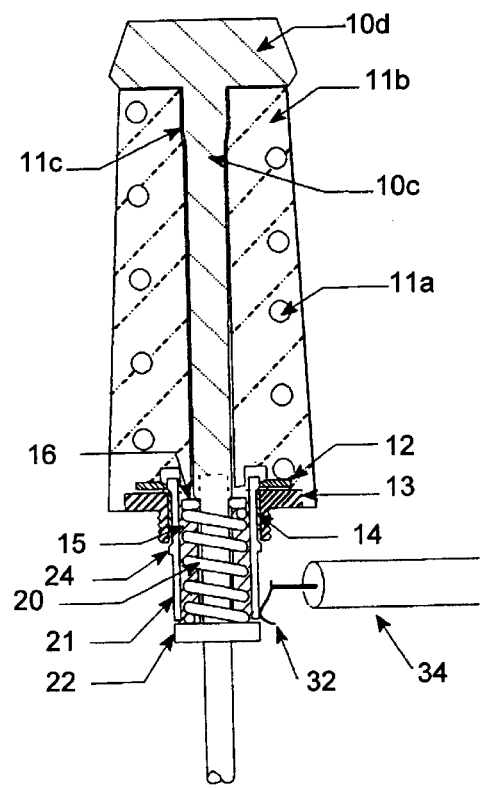

FIGS. 3 and 4 are cross-sectional views of a preferred embodiment of the two antennas of FIG. 1. The small antenna 1 in FIG. 1 is realized by a helix antenna 11a intended to be used during the stand-by mode of the mobile station, while the large antenna 2 in FIG. 1 is realized by a half-wave type whip antenna 10a. Both antennas are mounted on the telephone housing 6. As described below the whip antenna 10a is furthermore retractable into the housing. The helix antenna 11a is surrounded by a dielectric material 11b, providing stability and protection against mechanical stress, which is particularly important in stand-by mode, since the mobile station is then often carried in pockets, bags, or the like. The whip antenna 10a is arranged in a cavity 11d of the dielectric material 11b. In FIG. 3 the whip antenna is shown fully extended and in electric contact with a coaxial cable 34 through an impedance matching network by means of a metallic reed 32. The other end of the coaxial cable 34 is connected to the transmitter/receiver unit 4 according to FIGS. 1 and 2.

The impedance matching network, comprising a coil 20, a metallic tube 21, a dielectric body 15, and two ring-shaped connectors 16 and 22, respectively, is vertically displaceable between an upper, engaged position according to FIG. 3 and a lower, disengaged position according to FIG. 4. In the upper position according to FIG. 3 the metallic tube 21 is in galvanic contact with a threaded fixture 13 by means of a flange 24, said fixture in turn being screwed into the housing 6 of the mobile station, thus bringing the metallic tube 21 to ground potential. In the engaged position according to FIG. 3 the impedance matching network may be regarded as a so-called π-filter for impedance matching between the input impedance 58 ($Z_{ANT}$) of the whip antenna 10a and the output impedance 59 ($Z_{Rx/Tx}$) of the transmitter/receiver unit 4. Conventionally, the latter is 50 Ω, as is the impedance of the coaxial cable, while the whip antenna 10a, being an end-fed half-wave type antenna, has an input impedance theoretically being infinitely large but practically having a value of about 200–250 Ω. The need for impedance matching when using half-wave antennas in mobile telephones is well-known. Previously known solutions include separately arranged filter circuits, which are space-consuming and cost-increasing.

Figure 5:
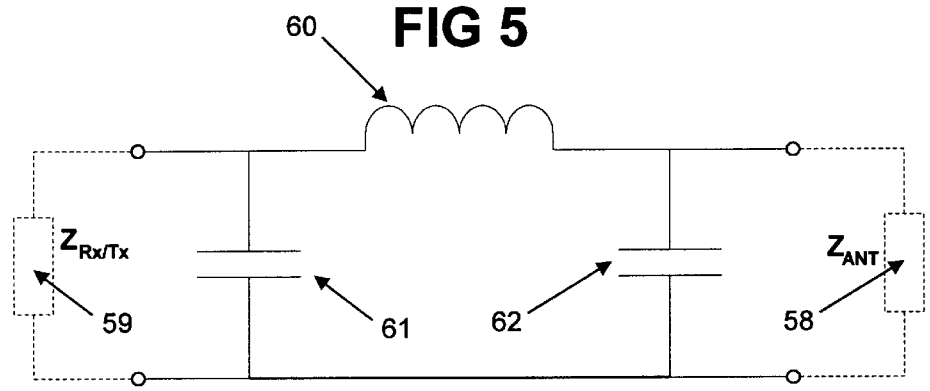
FIG. 5 is an equivalent electrical circuit diagram of a detail in FIGS. 3 and 4.

The π-filter is diagramatically shown in FIG. 5. The inductance 60 corresponds to the coil 20, and the capacitances 61 and 62 correspond to charges on the coil, said charges being separated from the grounded metallic tube 21 described above by the dielectric material 15. Otherwise the key function of impedance matching filters is well-known to a man skilled in the art and is consequently not described further.

In FIG. 4 the whip antenna 10a is shown in its fully retracted position. At the same time the impedance matching network is in its lower position and is, together with the whip antenna, electrically disconnected. Instead the helix antenna 11a is electrically connected to the transmitter/receiver unit 4, since the metallic reed 32 is now in contact with the metallic tube 21 rather than with the connector 22. Thus, the metallic tube 21 has no longer any electrical contact with the fixture 13 and is consequently no longer grounded. In this position an isolating sleeve 14 separates the metallic tube 21 from the fixture 13. Instead the metallic tube is in galvanic contact with a ring-shaped connector 12, said connector in turn being in galvanic contact with the helix antenna 11a. Unlike the whip antenna 10a the helix antenna 11a is not fed through the disconnected impedance matching network, since a helix antenna may easily be designed for any desired input impedance (in this case 50 Ω).

In order to avoid mutual coupling between the two antennas a dielectric section 10c is arranged around the upper end of the whip antenna 10a, and another dielectric section 10b is arranged around the lower end of the whip antenna. An antenna head 10d is arranged on the section 10c and is preferably formed to constitute an integrated unit.

A stopping means 10e is arranged at the lower end of the whip antenna to be frictionally engaged with the ring-shaped connector 22, so as to maintain the whip antenna 10a and the impedance matching network in their respective positions according to above. Furthermore, the flange 24 and the antenna head 10d are adopted to be engaged with the fixture 13 and a cavity 11c, respectively.

The actual switching from the extended position of the whip antenna to its retracted position is carried out, when the user of the mobile station pushes the whip antenna 10a into the telephone housing 6, the lower part of the section 10c thereby contacting the ring-shaped connector 16, and the impedance matching network thereby being displaced from its upper position to its lower position. In a corresponding way the impedance matching network is displaced from its lower position to its upper position, when the user grabs the antenna head 10d and extends the whip antenna 10a, the stopping means 10e and the dielectric section 10b thereby engaging the ring-shaped connectors 22 and 16, respectively.

By the antenna switching arrangement described above the antenna switch 3 (which is indicated in FIG. 1 and the function of which will be described in more detail below) is realized with minimum space demands and with few components, thanks to the antenna switching arrangement, including the impedance matching network, being fully integrated with the actual antenna system.

The antenna switch 3 is adapted to determine the operative engagement status of the second antenna 2; 10a–e, that is, whether the antenna is in electrical connection or engagement with the transmitter/receiver unit 4. The term "electrical connection" in this case refers to any galvanic, capacitive, or inductive coupling, or any combination thereof. Thus, according to the preferred embodiment of the invention, the antenna switch 3 is provided with means not shown in the drawings for determining the retracted and extended position, respectively, of the second antenna 2; 10a–e. Said means, which may be selected from a variety of mechanical, electrical, or optical switches or sensors well-known to a man skilled in the art, is/are arranged to supply the control unit 5 with control signals 7 in response to the detected antenna position. It is also possible to determine the electrical engagement of the second antenna indirectly by detecting the disengagement of the first antenna.

The operation of the mobile station or the radio telephone according to the invention will now be described. Initially, the mobile station is assumed to be in stand-by mode, the mobile station hence not serving any ongoing call at the moment. The regular communication between the mobile station and a selected base station entirely takes place by means of the stand-by antenna 1; 11a–d, the call antenna 2; 10a–e at the same time being electrically disconnected and fully retracted into the telephone housing 6.

The following occurs, when the base station notifies the mobile station of an incoming call. In a first step the control unit 5 checks if the user has taken any action for answering the call, for instance by pressing a suitable key (such as the "YES" or "OFF-hook" key) on the keypad. If this is true, the control unit determines whether the call antenna is fully extended or otherwise ready for servicing the forthcoming call establishment. If this is not true, a message is given to the user so as to inform him about this fact. The message may be in visual, acoustic, or sensoric form, or in any combination thereof. Preferably a message reading for instance "Pull out antenna" is shown on the mobile telephone display. As an alternative, an audio signal may be emitted through the speaker of the mobile telephone, or a vibration may be generated in the telephone or in any part thereof. As long as the call antenna is not fully extended or otherwise ready to serve a call, the control unit will block a given function of the mobile telephone necessary for the establishment of a call. Preferably this is achieved by preventing the transmission of a data sequence necessary for handshaking with the base station, before the call is established. Such a preventive action may easily be obtained by a man skilled in the art, and this is particularly true in such cases, where a microprocessor is used, since the action may be performed in software alone. A more "hands-on" solution involves simply disconnecting such components as the microphone or the speaker.

As soon as the blocking condition described above has been released by the user extending the call antenna, the blocking of the call establishing function described above is ended correspondingly, the call then being established in a conventional way. In such cases, where the antenna switch 3 constitutes a separate unit, which is not the case with the preferred antenna system described above, the control unit will supply a control signal to the antenna switch, said antenna switch then performing the electrical disconnection of the stand-by antenna 1 as well as the electrical connection of the call antenna 2 simultaneously.

A simpler form of the action sequence described above is as follows. Once the base station has notified the mobile station of an incoming call, the control unit 5 will simply disengage the particular key needed by the user in order to answer the incoming call "YES" or "OFF-hook" key. Then the user is notified as described above, and the "YES" or the "OFF-hook" key will not be engaged until the user has obeyed the request, the user then finally being able to answer the call.

When the call has been completed, the mobile station resumes its stand-by mode. During the stand-by mode any necessary communication is carried out by whatever antenna being electrically engaged at that moment. Usually, the user will retract the call antenna after the call has been completed, the call antenna thereby being disconnected and the stand-by antenna being connected, but the user may keep the call antenna in a connected or engaged state at his own desire, for instance due to severe signal conditions.

When the user, after having entered a telephone number on the keypad, tries to establish an outgoing call, for instance by pressing the "YES" key, the control unit will detect this and in a way similar to the one described above notify the user, that the call antenna must be engaged. From that moment any given function necessary for the call establishment is blocked in a way similar to the ones described above. The blocking will not be released until the user has indeed engaged the call antenna, and then the call may be established as usual.

The preferred embodiment of the invention described above is only to be regarded as an example. Different embodiments may deviate from what has been described above within the scope of the invention, as defined in the appended claims. For instance, as previously mentioned, the control unit functions may be realized according to many different hardware and/or software solutions, which is readily realized by a man skilled in the art. Furthermore, other antenna types than the ones described above may be used for the stand-by antenna as well as the call antenna. The call antenna has been described above as being extendable, but as an alternative it may be foldable up and down, the antenna for instance being folded down alongside the outer housing of the mobile telephone, when no call is being served by the phone.

Figure 6A:
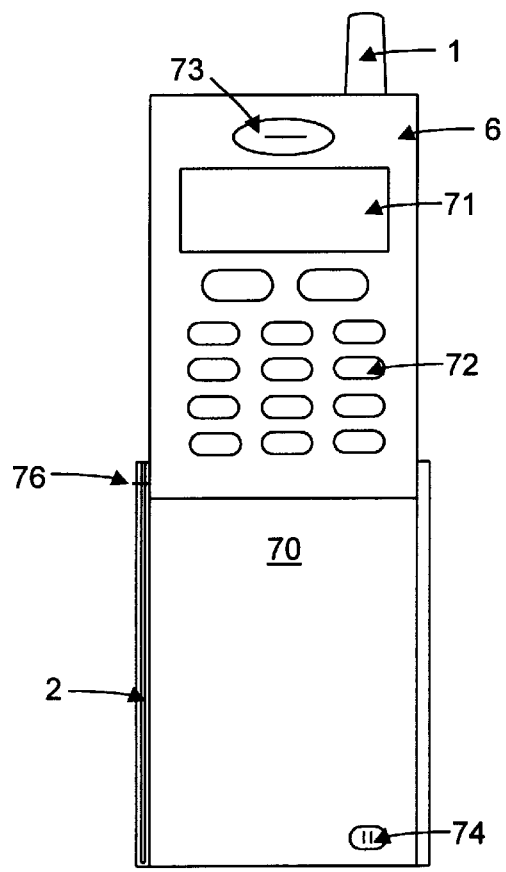
FIG. 6a is a front view of a radio telephone with its front cover or lid folded down, illustrating an antenna arrangement according to an alternative embodiment of the present invention.
Figure 6B:
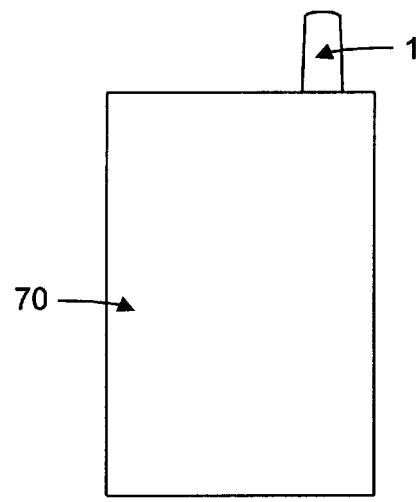
FIG. 6b shows the same radio telephone with its front cover folded up.
Figure 6C:
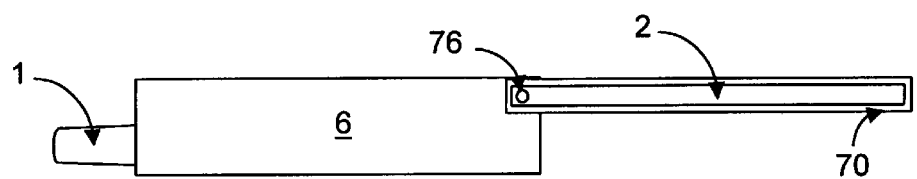
FIG. 6c is a cross-sectional view of the radio telephone according to FIG. 6a, FIG. 7a is a front view of a radio telephone with its front cover folded down, illustrating an antenna arrangement according to a second alternative embodiment of the present invention.

In FIGS. 6a–c there is shown an alternative antenna arrangement according to one embodiment of the invention. As usual, the radio telephone comprises a telephone housing 6, a display 71, a keypad 72, a speaker 73, and a microphone 74, and furthermore the radio telephone comprises a foldable front cover or lid 70, which is arranged to be folded up according to FIG. 6b when no call is being served, thereby covering the front side of the telephone. When an incoming call is to be answered, or when an outgoing call is to be initiated, the user will fold down the front cover 70 in a conventional way around the rotation axis 76 according to FIG. 6a.

As before, the stand-by antenna 1 is mounted on top of the telephone housing 6. The call antenna 2, preferably being constituted by an end-fed half-wave type swivel antenna, is arranged on the inside of the front cover 70 in the vicinity of one of its longer sides. The antenna 2 is pivotably mounted on the same axis 76 as the front cover 70 and will follow the front cover, when the latter is folded up and down, respectively, by the user when using the telephone. At its pivoted end the antenna 2 is connected by conventional electrical means to the transmitter/receiver unit 4, for instance via a coaxial cable.

By the arrangement above the antenna 2 will be directed downwards and away from the user's head during ongoing calls in a direction in parallel with the front cover 70 and substantially pointing vertically downwards, thereby obtaining a maximum distance to the head. In conjunction with the measures described above for preventing any use of the stand-by antenna 1 during ongoing calls, an antenna arrangement according to FIGS. 6a–c provides further reduced interaction between the antenna and the user's body, thereby providing reduced signal degradation and, consequently, an improved antenna efficiency. Otherwise, the radio telephone functions are the same as previously described.

Figure 7A:
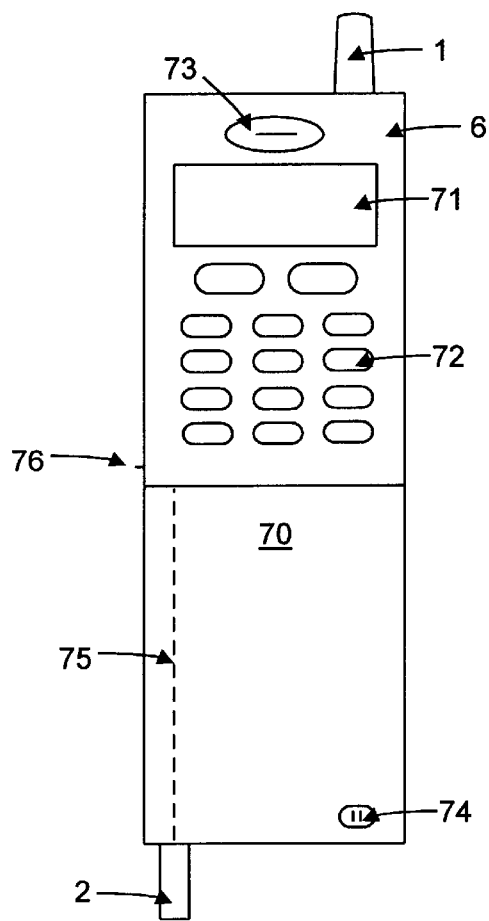
FIG. 7b shows the same radio telephone with its front cover folded up.
FIG. 7c is a cross-sectional view of the radio telephone aaccording to FIG. 7a, FIG. 8a is a front view of a radio telephone with its front cover folded down, illustrating an antenna arrangement according to a third alternative embodiment of the present invention.
Figure 7B:
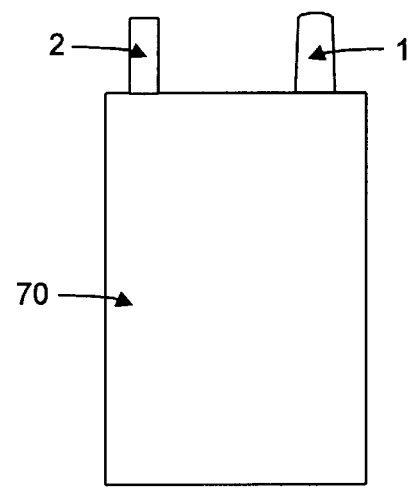
Figure 7C:
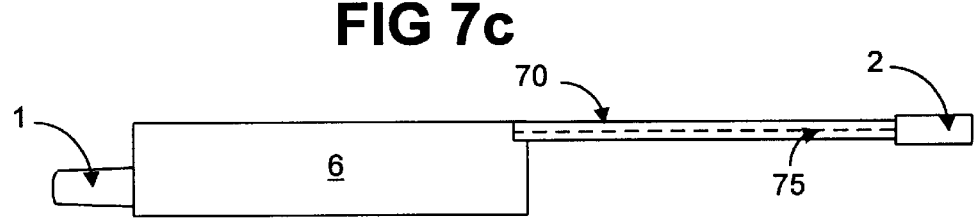

In FIGS. 7a–c there is shown yet another antenna arrangement, which corresponds to the one shown in FIG. 6, except that a shorter antenna is used as the call antenna 2. The antenna 2, preferably constituted by a helix antenna, is mounted at the bottom side (as viewed in FIG. 7) of the front cover 70 and is connected to the other telephone components, for instance the transmitter/receiver unit 4, via a coaxial cable 75 arranged on the inside of the front cover 70 along one of its longer sides.

Reference numerals with the same numbers in FIGS. 6a–c and in FIGS. 7a–c represent identical parts and are therefore not described in more detail. As appears from FIG. 7b the call antenna 2 extends above the telephone, when the front cover 70 is in its upper position, but, as previously, the user is prevented from using the call antenna 2 in this situation.

Figure 8A:
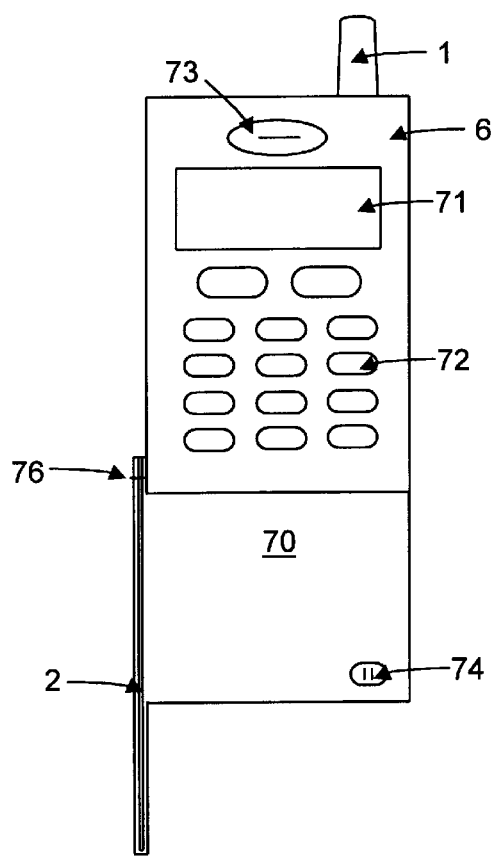
Figure 8B:
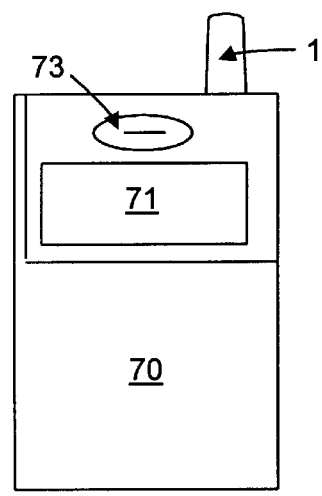

In FIGS. 8a–b there is shown yet another antenna arrangement. This embodiment is substantially identical to the one shown i FIGS. 6a–c, except that the front cover does not cover the whole telephone when folded up. Thanks to this feature the display 71 is visible to the user, even when the front cover 70 is folded up.

It should be obvious to a man skilled in the art that the embodiments according to FIGS. 6–8 may be varied in various ways. For instance, the call antenna 2 may as an alternative be arranged on the outside of the front cover 70 or may be embedded in the front cover 70, and it may extend transversally across the front cover 70 instead of along one of its longer sides. Instead of being pivotably arranged around the axis 76 the front cover 70 may be displaceable in the vertical direction between an upper position, where the front cover covers the major part of the radio telephone, and a lower position, where the radio telephone is used for calls. Furthermore, the front cover 70 may be arranged to be pushed a short distance and then folded down by a rotation around an axis. In addition, the antenna 2 may be realized by a so-called patch antenna mounted for instance inside the front cover, i.e., a metallic plate, preferably having a square shape.

Within the scope of the invention it is also possible to keep the stand-by antenna constantly engaged, if the antenna system is designed in such a way, that the stand-by antenna is functioning as a receiving antenna together with (i.e., simultaneously with) the call antenna in order to obtain antenna diversity gain in receiving mode or so-called downlink mode.

We claim:

1. A method of controlling the establishment of incoming and outgoing calls in a radio telephone, comprising a first antenna (1; 11a–d), the properties of which are optimized for use in stand-by mode, and a second antenna (2; 10a–e), the properties of which are optimized for use during ongoing calls, characterized by the steps of
    a) determining whether the second antenna (2; 10a–e) is in electrical and/or operative connection with a transmitter/receiver unit (4) in the radio telephone and, if this is not the case, blocking at least one radio telephone function necessary for the establishment of a call,
    b) repeating the determination according to a), until the condition in a) is satisfied, and
    c) releasing the blocking according to a), as soon as the condition in a) has been satisfied, thereafter establishing the call.

2. A method according to claim 1, characterized by the additional step of a') notifying a user of the radio telephone, when the condition in a) is not satisfied, by visual, acoustical, or sensoric means.

3. A method according to claim 2, characterized in that the notification according to a') is given as a text message on a radio telephone display.

4. A method according to claim 2, characterized in that the notification according to a') is given as an audio signal in a speaker in the radio telephone.

5. A method according to claim 2, characterized in that the notification according to a') is given as a vibration in the radio telephone or in a part of the radio telephone.

6. A method according to claim 1, characterized in that the function necessary for the establishment of a call is constituted by a data sequence being transmitted from the radio telephone for handshaking with a radio station used for forwarding the call.

7. A method according to claim 1, characterized in that the function necessary for the establishment of a call is blocked by operatively disconnecting at least one key in a radio telephone keypad.

8. A method according to claim 1, characterized by the step of detecting the electrical engagement status of the first antenna (11; 11a–d) and using this information in the determining step according to a).

9. A radio telephone for use in wireless telecommunication, comprising a transmitter/receiver unit (4), a control unit (5), a first antenna (1; 11a–d), the properties of which are optimized for use in stand-by mode, and a second antenna (2; 10a–e), the properties of which are optimized for use during ongoing calls, said second antenna being electrically engageable and disengageable with the transmitter/receiver unit, characterized by an antenna switch (3), which is arranged to operatively connect the transmitter/receiver unit (4) to either the first antenna (1; 11a–d) or the second antenna (2; 10a–e), said antenna switch supplying the control unit (5) with control signals (7) in response to at least the electrical engagement status of the second antenna, said control unit being arranged to prevent incoming as well outgoing calls from being established, as long as the second antenna according to said control signals is indicated to be electrically disengaged.

10. A radio telephone according to claim 9, characterized in that the first antenna (1; 11a–d) is constituted by a helix antenna (11a–d).

11. A radio telephone according to claim 9, characterized in that the second antenna (2) is arranged on a surface of a rotatable and/or displaceable front cover (70) of the radio telephone.

12. A radio telephone according to claim 11, characterized in that the second antenna (2) is so arranged that the antenna—when the front cover (70) is folded down during calls—is directed away from the radio telephone in substantially the same plane as the front cover.

13. A radio telephone according to claim 11, characterized in that the second antenna (2) is constituted by a end-fed half-wave antenna being mounted inside the front cover (70) along one of its longer sides.

14. A radio telephone according to claim 9, characterized in that the second antenna (2; 10a–e) is constituted by a whip antenna (10a–e), which is arranged to extend from the telephone housing (6) during calls and to be retracted into the telephone housing (6) or to be folded down along its outer housing, when no calls are served.

15. A radio telephone according to claim 14, characterized by
    an impedance matching network, comprising a metallic tube (21), a coil (20) arranged in the metallic tube, a dielectric material (15) arranged between the coil and the metallic tube, and a first and a second ring-shaped connector (16, 22) being connected to the first and the second end of the coil, respectively;
    the helix antenna (11a–d), comprising a helical electric conductor (11a), a substantially cylindrical dielectric body (11b) surrounding the conductor, and a cavity (11c–d) arranged in the center of the body along its length extension; and
    the whip antenna (10a–e), which is arranged in the cavity of the helix antenna (11c–d) and which is arranged to be extended from the telephone housing (6) and retracted into the same, respectively, said impedance matching network being arranged to have a first position, when the whip antenna is extended, said whip antenna thereby having electrical contact with the transmitter/receiver unit (4) through the first ring-shaped connector (16), the coil (20) and the second ring-shaped connector (22), and to have a second position, when the whip antenna is retracted, said helix antenna thereby having electrical contact with the transmitter/receiver unit through the metallic tube (21).

16. A radio telephone according to claim 10, characterized in that the second antenna is arranged on a surface of a rotatable and/or displaceable front cover of the radio telephone.

17. A radio telephone according to claim 12, characterized in that the second antenna is constituted by a end-fed half-wave antenna being mounted inside the front cover along one of its longer sides.

18. A radio telephone according to claim 10, characterized in that the second antenna is constituted by a whip antenna, which is arranged to extend from the telephone housing during calls and to be retracted into the telephone housing or to be folded down along its outer housing, when no calls are served.

* * * * *